US008526956B2

(12) United States Patent  
Oh

(10) Patent No.: US 8,526,956 B2  
(45) Date of Patent: Sep. 3, 2013

(54) METHOD, MEDIUM, AND APPARATUS CONTROLLING HANDOVER BETWEEN DIFFERENT NETWORKS

(75) Inventor: Se-jong Oh, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/442,253

(22) Filed: Apr. 9, 2012

(65) Prior Publication Data

US 2012/0195288 A1 Aug. 2, 2012

Related U.S. Application Data

(63) Continuation of application No. 11/178,413, filed on Jul. 12, 2005, now Pat. No. 8,175,599.

(30) Foreign Application Priority Data

Jul. 12, 2004 (KR) .................................. 2004-53987

(51) Int. Cl.  
*H04W 36/00* (2009.01)

(52) U.S. Cl.  
USPC ............ 455/436; 455/437; 455/442; 370/331

(58) Field of Classification Search  
USPC .................. 455/436–442; 370/331  
See application file for complete search history.

(56) References Cited

U.S. PATENT DOCUMENTS

| 6,768,908 | B1 * | 7/2004 | Jalloul et al. ................... 455/442 |
| 2003/0114159 | A1 * | 6/2003 | Park et al. ...................... 455/436 |
| 2004/0064563 | A1 | 4/2004 | Kauhanen et al. | |
| 2004/0097232 | A1 | 5/2004 | Haverinen | |
| 2005/0208945 | A1 | 9/2005 | Hong et al. | |
| 2006/0041431 | A1 | 2/2006 | Maes | |
| 2006/0080407 | A1 | 4/2006 | Rengaraju | |
| 2007/0129077 | A1 | 6/2007 | Iguchi et al. | |

FOREIGN PATENT DOCUMENTS

| JP | 2002-084339 | 3/2002 |
| KR | 1020030050309 A | 12/2001 |

OTHER PUBLICATIONS

3GPP TR 22.934—V6.2.0 (Sep. 2003).  
"A Study of Handover Method among Difference Wireless Access Networks" (M. Matsumoto, Y. Takagi, A. Kurokawa) NTT Network Service Systems Laboratories, NTT Corporation; B-6-41, (2003).  
"Implementation of a Context-based Seamless Networking System" (M. Inoue, K. Mahmud, M. Murakami, M. Hasegawa, H. Morikawa) Yokosuka Radio Communications Research Center, Communications Research Laboratory; SB-3-5, (2004).

(Continued)

*Primary Examiner* — Wayne Cai  
(74) *Attorney, Agent, or Firm* — Staas & Halsey LLP

(57) ABSTRACT

A method, medium, and apparatus controlling a handover between different network types, including the operations of transmitting a message requesting a transmission bandwidth change, so as to have a transmission bandwidth supported by a new network after movement of the mobile terminal, from the mobile terminal to the server after performing the handover, changing the transmission bandwidth of the server to be supported by the new network based on the transmitted message of requesting the bandwidth change, transmitting a message acknowledging the changed transmission bandwidth from the server to the router, and transceiving data through a new data transmission tunnel between the router and a new access point within the new based on the message acknowledging the changed transmission bandwidth. Accordingly, loss of data packets occurring when a handover is performed may be effectively prevented.

28 Claims, 5 Drawing Sheets

(56) References Cited

OTHER PUBLICATIONS

U.S. Appl. No. 11/178,413, filed Jul. 12, 2005, Se-jong Oh, Samsung Electronics Co., LTD.
Korean Intellectual Property Office Action dated Mar. 23, 2006.
U.S. Office Action mailed Feb. 5, 2009 in parent U.S. Appl. No. 11/178,413.
U.S. Office Action mailed May 29, 2009 in parent U.S. Appl. No. 11/178,413.
U.S. Office Action mailed Dec. 30, 2009 in parent U.S. Appl. No. 11/178,413.
U.S. Office Action mailed Jun. 22, 2010 in parent U.S. Appl. No. 11/178,413.
U.S. Office Action mailed Jan. 24, 2011 in parent U.S. Appl. No. 11/178,413.
U.S. Office Action mailed Oct. 3, 2011 in parent U.S. Appl. No. 11/178,413.
Notice of Allowance mailed Jan. 19, 2012 in parent U.S. Appl. No. 11/178,413.

* cited by examiner

METHOD, MEDIUM, AND APPARATUS CONTROLLING HANDOVER BETWEEN DIFFERENT NETWORKS

CROSS-REFERENCE TO RELATED APPLICATIONS

This application is a continuation of application Ser. No. 11/178,413 filed on Jul. 12, 2005, now U.S. Pat. No. 8,175,599 which claims the priority of Korean Patent Application No. 2004-53987, filed on Jul. 12, 2004, in the Korean Intellectual Property Office, the disclosure of which is incorporated herein by reference.

BACKGROUND OF THE INVENTION

1. Field of the Invention

Embodiments of the present invention relate to methods, media, and apparatuses controlling a handover, and more particularly, to methods, media, and apparatuses controlling a handover, without deteriorating the quality of data transceived when the handover is performed between different network types.

2. Description of the Related Art

In recent years, the number of wireless Internet users has increased due to the rapid spread of the Internet, the development of wireless communication technology, and performance enhancements in mobile terminals such as a portable computer and a personal digital assistant (PDA). A mobile terminal may frequently travel from network access points within a wireless Internet environment.

To enable the mobile terminal to perform wireless Internet communication, an Internet service having the same high quality as that of a current network environment should be ensured even when the mobile terminal moves from a current network area to another network area. In other words, the mobile terminal should perform seamless communication. That is why the handover is derived therefrom, which means a function of transferring a communication procedure from an access point (hereinafter, it will be referred to as AP) in the current network area to an AP in the next network area. An Inter-Access Point Protocol (IAPP) for communication and handover between APs is defined by the Institute of Electrical and Electronics Engineers (IEEE).

In the meantime, real time multimedia services, including Video On Demand (VOD), Audio On Demand (AOD), picture phones, video chatting, and so forth have become popular due to recent Internet developments. In particular, such services have become popular due recent wireless Internet developments and enhancements in processing powers, real time multimedia services using the mobile terminal have been enabled, and associated markets are rapidly growing.

By way of the above-mentioned technology developments, it has been possible for a user to move while receiving real time multimedia services through his/her mobile terminal. As a result, this movement is followed by a handover of the mobile terminal to the next AP. Accordingly, much research has been conducted on control methods capable of effectively performing the handover.

Conventionally, when the mobile terminal performed the handover, the difference between a previous transmission Band Width (BW) supported by a previous network, e.g., before movement of the mobile terminal, and a transmission BW supported by a current network terminal was not considered. As a result, when the transmission BW supported by the previous network is larger than that supported by the current network, after movement, loss of data packets was not compensated for due to the difference of the transmission BWs, which causes the quality of the real time multimedia service to be deteriorated.

For example, assuming that the previous network, before movement, is a Wireless Local Area Network (WLAN), and the current network after movement is a 3 Generation Partnership Project (3GPP) wireless network, the WLAN area supports 384 Kbps as the transmission BW, while the 3GPP wireless network area supports 144 Kbps as the transmission BW. When the user moves from the WLAN area to the 3GPP wireless network area, while receiving the real time multimedia service through his/her own mobile terminal under these environments, there occurs a transmission BW difference. As a result, the quality of the real time multimedia service deteriorates.

SUMMARY OF THE INVENTION

An aspect of the present invention includes solving at least the above problems and/or disadvantages and to provide at least the advantages described below. Accordingly, an aspect of the present invention is to provide a method, medium, and apparatus controlling a handover, which is capable of transmitting a bandwidth change request message from a mobile terminal to a data providing service by way of an RTCP (RTP Control Protocol) message packet when the handover is performed between different kinds of networks.

Another aspect of the present invention is to provide a method, medium, and apparatus controlling a handover, which is capable of transceiving data through a new second layer tunnel (L2 tunnel; L2-t) by changing a current L2-t to a new L2-t by way of an M field of an RTP (Real time Transport Protocol) packet when the handover is performed between different kinds of networks.

To achieve the above and/or other aspects and advantages, embodiments of the present invention include a method for controlling a network system, wherein a mobile terminal performs a handover from a first network to a second network during data transmission and/or reception through an existing data transmission tunnel between a router and an access point within the first network, including transmitting a message requesting a transmission bandwidth change of the data transmission and/or reception to a transmission bandwidth supported in the second network, from the mobile terminal to a server after performing the handover, changing the transmission bandwidth of the data transmission and/or reception to the transmission bandwidth supported by the second network based on the transmitted message requesting the transmission bandwidth change, transmitting a message acknowledging a changing of the transmission bandwidth of the data transmission and/or reception, from the server to the router, after the changing of the transmission bandwidth of the data transmission and/or reception, and transceiving data through a new data transmission tunnel between the router and an access point within the second network based on the message acknowledging the changing of the transmission bandwidth of the data transmission and/or reception.

The mobile terminal may perform the handover from the first network to the second network upon movement of the mobile terminal.

In addition, the transmitting of the message requesting the bandwidth change may include collecting information, by the mobile terminal, regarding the transmission bandwidth supported by the second network when the handover is performed, determining, by the mobile terminal, whether a difference between a transmission bandwidth supported by the first network and the transmission bandwidth supported by the second network is greater than a predetermined threshold, and transmitting the message requesting the bandwidth change from the mobile terminal to the server upon the determination that the difference is greater than the predetermined threshold.

Further, the method may include transmitting a vertical handover (VHO) request message from the mobile terminal to the router upon the handover being performed, and building, by the router, the new data transmission tunnel based on the transmitted VHO request message, as well as entering a standby mode, by the router, maintaining the data transmission and/or reception through the existing data transmission tunnel based on the transmitted VHO request message, and wherein the transceiving of the data transmission and/or reception includes having the router change the data transmission and/or reception from the existing data transmission tunnel to the new data transmission tunnel when the message acknowledging the changing of the transmission bandwidth of the data transmission and/or reception is transmitted.

The message requesting the bandwidth change may use an application (APP) message among RTP control protocol (RTCP) messages. In addition, the message acknowledging the changing of the transmission bandwidth of the data transmission and/or reception may use a real time transport protocol (RTP) in which an M field is set to 1.

To achieve the above and/or other aspects and advantages, embodiments of the present invention include a method for controlling a mobile terminal in a network system, wherein the mobile terminal performs a handover from a first network to a second network during data transmission and/or reception through an existing data transmission tunnel between a router and an access point within the first network, including transmitting to a server a message requesting a bandwidth change of the data transmission and/or reception to a transmission bandwidth supported by the second network after performing the handover, and transceiving data through a new data transmission tunnel between the router and an access point within the second network when a message acknowledging a changing of the transmission bandwidth of the data transmission and/or reception, based on the transmitted message requesting the bandwidth change, is transmitted from the server to the router.

The transmitting of the message requesting the bandwidth change may include collecting information with respect to the transmission bandwidth supported by the second network when the handover is performed, determining whether a difference between the transmission bandwidth supported by the second network and a transmission bandwidth supported by the first network is greater than a predetermined threshold, and transmitting the message requesting the bandwidth change to the server upon the determination whether the difference is greater than the predetermined threshold.

The method may further include transmitting a vertical handover (VHO) request message to the router when the handover is performed, and transceiving data with the router, which has entered a standby mode of maintaining the data transmission and/or reception through the existing data transmission tunnel, based on the transmitted VHO request message.

To achieve the above and/or other aspects and advantages, embodiments of the present invention include a method for controlling a router in a network system, wherein a mobile terminal performs a handover from a first network to a second network during data transmission and/or reception through an existing data transmission tunnel between a router and an access point within the first network, including receiving a vertical handover (VHO) request message from the mobile terminal, building a new data transmission tunnel between the router and an access point within the second network based on the received VHO request message, and transceiving data through the new data transmission tunnel between the router and the access point within the second network when a message acknowledging a changing of the transmission bandwidth of the data transmission and/or reception, based on a message from the mobile terminal to the server requesting a transmission bandwidth change of the data transmission and/or reception so as to have a transmission bandwidth supported by the second network, is received from the server.

The transceiving of the data may include receiving from the server the message acknowledging the changing of the transmission bandwidth of the data transmission and/or reception, changing the data transmission and/or reception from the existing data transmission tunnel to the new data transmission tunnel based on the received message acknowledging the changing of the transmission bandwidth of the data transmission and/or reception, and transceiving data through the new data transmission tunnel.

To achieve the above and/or other aspects and advantages, embodiments of the present invention include at least one medium including computer readable code implementing embodiments of the present invention.

To achieve the above and/or other aspects and advantages, embodiments of the present invention include a network system, wherein a mobile terminal performs a handover from a first network to a second network during data transmission and/or reception through an existing data transmission tunnel between a router and an access point within the first network, including the mobile terminal to transmit to a server a message requesting a transmission bandwidth change of the data transmission and/or reception to a transmission bandwidth supported in the second network, after performing the handover, the server to change the transmission bandwidth of the data transmission and/or reception to the transmission bandwidth supported by the second network based on receipt of the message requesting the transmission bandwidth change, and to transmit a message to the router acknowledging a changing of the transmission bandwidth of the data transmission and/or reception, after the changing of the transmission bandwidth of the data transmission and/or reception, and the router to transceive data through a new data transmission tunnel between the router and an access point within the second network based on the message acknowledging the changing of the transmission bandwidth of the data transmission and/or reception.

The mobile terminal may perform the handover from the first network to the second network upon movement of the mobile terminal.

In the transmitting of the message requesting the bandwidth change, the mobile terminal may collect information regarding the transmission bandwidth supported by the second network when the handover is performed, determine whether a difference between a transmission bandwidth supported by the first network and the transmission bandwidth supported by the second network is greater than a predetermined threshold, and transmit the message requesting the bandwidth change to the server upon the determination that the difference is greater than the predetermined threshold.

The mobile terminal may also transmit a vertical handover (VHO) request message to the router upon the handover being performed and the router builds the new data transmission tunnel based on the transmitted VHO request message.

The router may enter a standby mode to maintain the data transmission and/or reception through the existing data transmission tunnel based on the transmitted VHO request message, and the router may change the data transmission and/or reception from the existing data transmission tunnel to the new data transmission tunnel when the message acknowledging the changing of the transmission bandwidth of the data transmission and/or reception is received.

To achieve the above and/or other aspects and advantages, embodiments of the present invention include a mobile terminal to at least perform a handover from a first network to a second network during data transmission and/or reception through an existing data transmission tunnel between a router and an access point within the first network, transmit to a server a message requesting a bandwidth change of the data transmission and/or reception to a transmission bandwidth supported by the second network after performing the handover, and transceive data through a new data transmission tunnel between the router and an access point within the second network when a message acknowledging a changing of the transmission bandwidth of the data transmission and/or reception, based on the transmitted message requesting the bandwidth change, is transmitted from the server to the router.

In the transmitting of the message requesting the bandwidth change, the mobile terminal may collect information with respect to the transmission bandwidth supported by the second network when the handover is performed, determine whether a difference between the transmission bandwidth supported by the second network and a transmission bandwidth supported by the first network is greater than a predetermined threshold, and transmit the message requesting the bandwidth change to the server upon the determination whether the difference is greater than the predetermined threshold.

To achieve the above and/or other aspects and advantages, embodiments of the present invention include a router, in a network system wherein a mobile terminal performs a handover from a first network to a second network during data transmission and/or reception through an existing data transmission tunnel between the router and an access point within the first network, to at least receive a vertical handover (VHO) request message from the mobile terminal, build a new data transmission tunnel between the router and an access point within the second network based on the received VHO request message, and transceive data through the new data transmission tunnel between the router and the access point within the second network when a message acknowledging a changing of the transmission bandwidth of the data transmission and/or reception, based on a message from the mobile terminal to the server requesting a transmission bandwidth change of the data transmission and/or reception so as to have a transmission bandwidth supported by the second network, is received from the server.

In the transceiving of the data, the router may at least receive from the server the message acknowledging the changing of the transmission bandwidth of the data transmission and/or reception, change the data transmission and/or reception from the existing data transmission tunnel to the new data transmission tunnel based on the received message acknowledging the changing of the transmission bandwidth of the data transmission and/or reception, and transceive data through the new data transmission tunnel.

In addition, the router may enter a standby mode of maintaining data transmission and/or reception through the new data transmission tunnel based on the received VHO request message, and change the data transmission and/or reception from the existing data transmission tunnel to the new data transmission tunnel when the message acknowledging the changing of the transmission bandwidth of the data transmission and/or reception is received during the standby mode.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
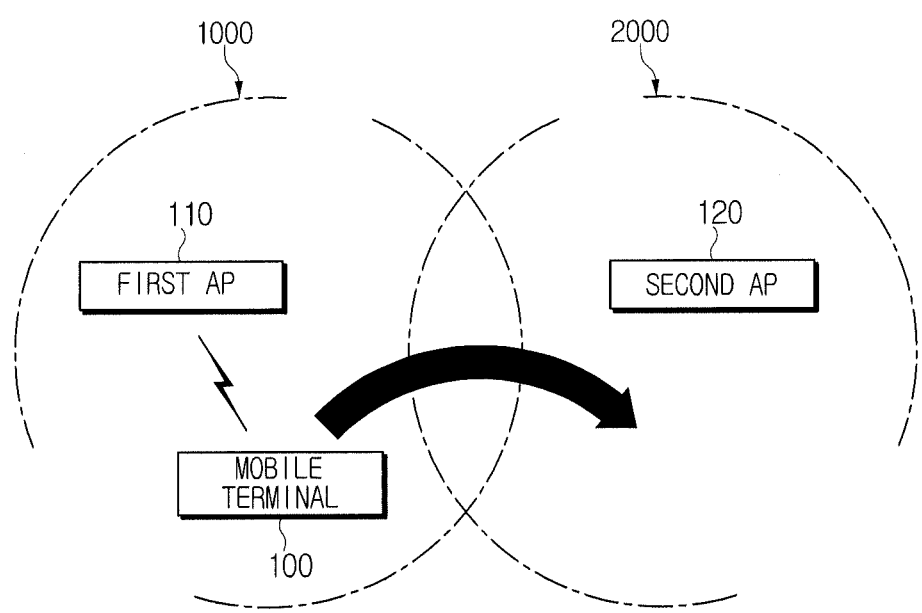
FIG. 1 illustrates a handover between different network types, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a procedure for performing a handover between different network types, in accordance with an embodiment of the present invention.

Referring to FIG. 1, wireless networks 1000 and 2000 include respective APs 110 and 120 and a mobile terminal 100, such as a portable computer or a PDA, which performs wireless communication with the APs 110 and 120. The APs 110 and 120 may connect a wired LAN with a wireless LAN so as to allow a user using the mobile terminal 100 to readily connect to the Internet, for example.

Referring back to FIG. 1, the mobile terminal 100 can perform a handover from the first AP 110 within the first network 1000, which will be considered the previous network, to a second AP 120 within the second network 2000, which will be considered the current network, i.e., after movement of the mobile terminal. In this case, a dual mode terminal which is capable of simultaneously accessing two wireless channels may be employed for the mobile terminal 100.

Whether the mobile terminal 100 has performed the handover may be determined by having the mobile terminal 100 analyze a channel state of a received signal. In this case, the intensity or the electric energy of the received signal may be used for analyzing the channel state. The mobile terminal 100 can compare the intensity or the electric energy of the received signal with a predetermined threshold value, and determine that the handover was performed when the intensity or the electric energy of the received signal is not more than the predetermined threshold value. However, the present invention is not limited to the above-mentioned method for determining whether the handover has been performed.

The mobile terminal 100 can perform the handover from the first network 1000 to the second network 2000, again noting that the first and second networks 1000 and 2000 may support different transmission BWs when they are different types of networks, e.g., one network being a WLAN and the other being a 3GPP network.

According to an embodiment of the present invention, the mobile terminal 100 can transmit to a data providing server a message requesting the data providing server to change a transmission BW to one supported by the second network 2000, and the data providing server in turn can change the transmission BW to transmit data packets within the transmission BW supported by the second network 2000.

Figure 2:
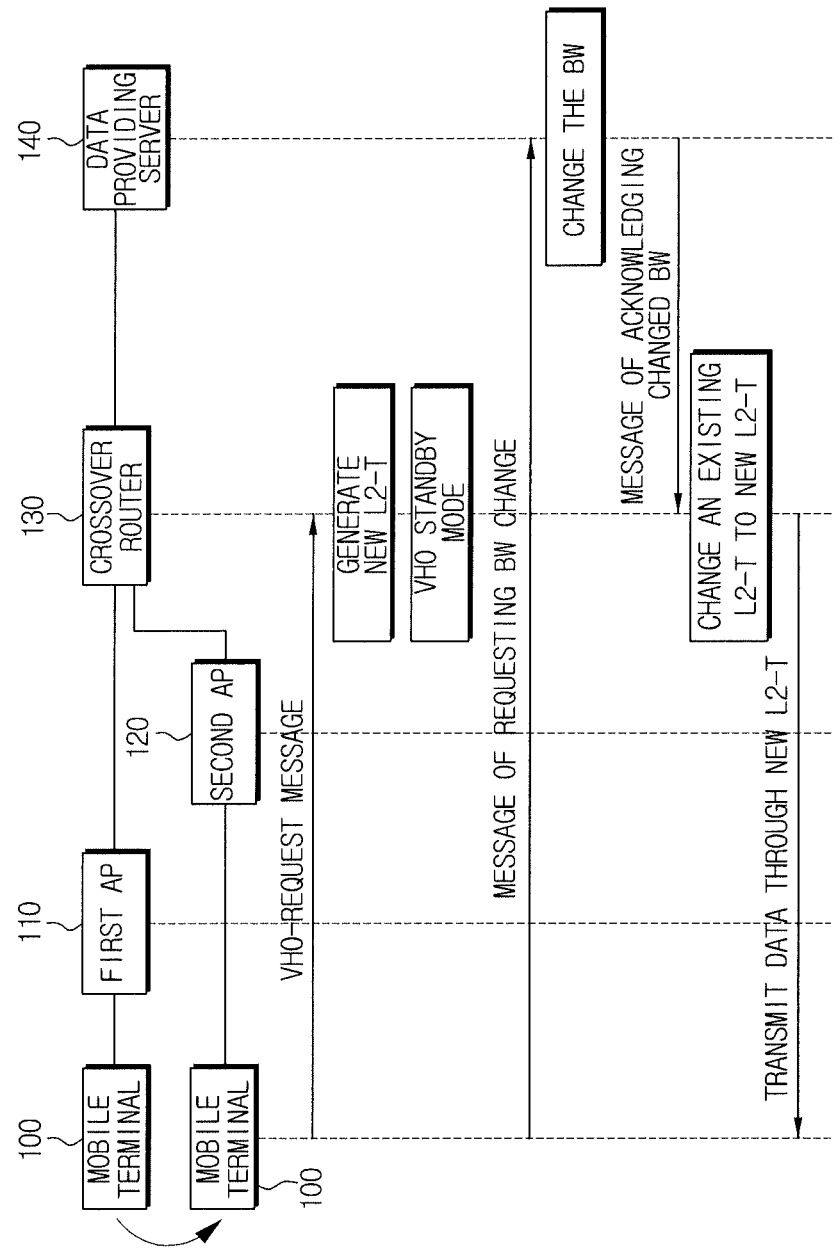
FIG. 2 illustrates a handover control procedure applied when a handover is performed between different network types, according to an embodiment of the present invention.

FIG. 2 illustrates a diagram for a handover control procedure applied when the handover is performed between different network types, in accordance with and embodiment of the present invention.

Referring to FIGS. 1 and 2, the mobile terminal 100 wirelessly connected to the first AP 110 can receive data from the data providing server 140 through a crossover router 130, for example. In this case, the crossover router 130 transceives data with the first AP 110, through an existing second layer tunnel, for example. The second layer tunnel means another connection generated between the first AP 110 and the crossover router 130 based on the wireless resource provided from the first network 1000 including the first AP 110.

When the mobile terminal 100 moves from the first network 1000 area to the second network 2000 area, that is, when the mobile terminal 100 performs the handover, the mobile terminal 100 transmits a vertical handover request message (VHO-request message) to the crossover router 130. The crossover router 130 can then build a new second layer tunnel based on the received VHO-request message. In this case, the new second layer tunnel means another connection generated between the second AP 120 and the crossover router 130 based on the wireless resource provided from the second network 2000 including the second AP 120.

The crossover router 130, which has built the new second layer tunnel for the second AP 120, can enter a standby mode. In this case, the standby mode means a mode in which the crossover router 130 uses the existing second layer tunnel for transceiving data even though the crossover router 130 has built the new second layer tunnel. Previously, the new second layer tunnel may have been built but was immediately employed to transceive data. As such, the transmission BW difference was not taken into consideration, which can cause some data packets to be lost due to the transmission BW difference.

In addition, when the mobile terminal 100 performs the handover, the mobile terminal 100 can transmit a message of requesting a BW change to the data providing server 140. In this case, prior to transmission of the message, the mobile terminal 100 can collect information with respect to the second network 2000, after it performs the handover, and will determine whether a BW difference even exists.

In the meantime, an Application (APP) message among RTCP messages may be applied, as the message of requesting the BW change. The RTCP messages generally include a Sender Report (SR) message, a Receiver Report (RR) message, a Source DEScription (SDES) message, a BYE (BYE) message, an APPlication (APP) message, and so forth, with the APP message being used for designating a new function limited to a new application when the new application or the new function is tested.

In addition, the RTCP messages are typically and periodically provided from the mobile terminal 100 to the data providing server 140. However, when the APP message is employed for the message requesting the BW change, as in embodiments of the present invention, the mobile terminal 100 not only periodically transmits the RTCP message to the data providing server 140 but processes the RTCP message to be transmitted to the data providing server 140 even when it has performed the handover. Hereinafter, as an example, the APP message will be employed as the message requesting the BW difference among the RTCP messages, however, it is apparent that the present invention is not limited thereto.

In the meantime, the data providing server 140 can change the applied transmission BW for the mobile terminal 100 based on the received message of requesting the BW change. Methods for changing the transmission BW may include a method for changing an encoding rate, and a method for not transmitting one flow in a session including a plurality of the flows, however, embodiments of the present invention are not necessarily limited to these above-mentioned case.

After the data providing server 140 changes the transmission BW, the data providing server 140 can transmit a message acknowledging the BW change to the crossover router 130. An RTP packet can be applied for the message acknowledging the BW change.

The RTP packet typically includes a V field as a version field, a P field used to form a packet on a 32 bit basis, an X field as an extension field, a CC field indicating the number of Contributing Source (CRSC) identifiers in a fixed header, an M field indicating a frame area with respect to multimedia information and used for discriminating voice, picture information, and so forth within a packet, a PT field indicating a RTP payload format of a profile defined by the Request for Comments (RFC) 1890, a sequence number field used for detecting a packet loss and storing again a packet order, etc. According to an embodiment of the present invention, when the RTP packet is applied as the message of acknowledging the BW change, after the data providing server 140 changes the transmission BW, the M field of the RTP packet is set to 1.

Hereinafter, only as an example, the RTP message will be applied as the message of acknowledging the BW change, however, it is apparent that the present invention is not limited thereto.

The crossover router 130 can then transceive various data with the mobile terminal 100 through the new second layer tunnel instead of the existing second layer tunnel based on the received message of acknowledging the BW change.

Accordingly, even after the mobile terminal 100 performs the handover, it may still receive seamless real time multimedia services.

Figure 3:
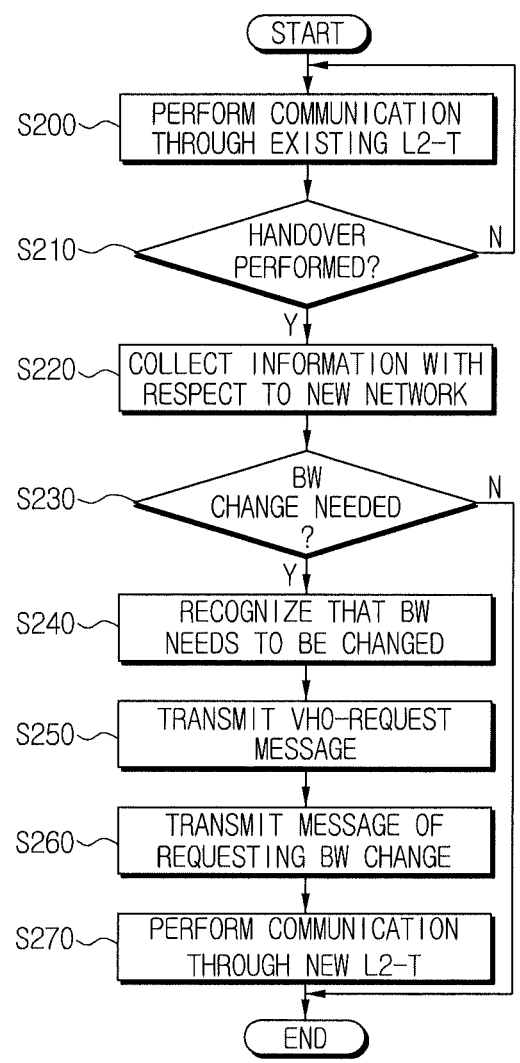
FIG. 3 illustrates a flow chart for a handover control procedure based on a mobile terminal, according to an embodiment of the present invention.

FIG. 3 illustrates a flow chart for a handover control procedure based on a mobile terminal, in accordance with and embodiment of the present invention.

Referring to FIGS. 1 to 3, the mobile terminal 100 can be wirelessly connected to the first AP 110 and transceive various data and messages with the first AP 110, through the existing second layer tunnel (operation S200). When the mobile terminal 100 moves out of the first network 1000 area into the second network 2000 area to perform the handover, so that it is triggered from the second layer (L2: data link layer) to the third layer (L3: application layer) (operation S210), the mobile terminal 100 collects information with respect to the second network 2000, i.e., the new network, in particular, collects information with respect to supported transmission BWs (operation S220). The mobile terminal 100 then compares the transmission BW capabilities (e.g., BW sizes) supported by the first network 1000 with that supported by the second network 2000 (operation S230). When the BW difference is greater than a predetermined threshold, such that the transmission BW needs to be changed, the mobile terminal 100 recognizes the fact that the transmission BW needs to be changed (operation S240). The mobile terminal 100 then transmits the VHO-request message to the crossover router 130 (operation S250) and the message requesting the BW change to the data providing server 140, as described above (operation S260). After the predetermined procedures are performed between the crossover router 130 and the data providing server 140, the mobile terminal 100 is wirelessly connected to the second AP 120 and transceives the various data and messages through the new second layer tunnel (operation S270).

Figure 4:
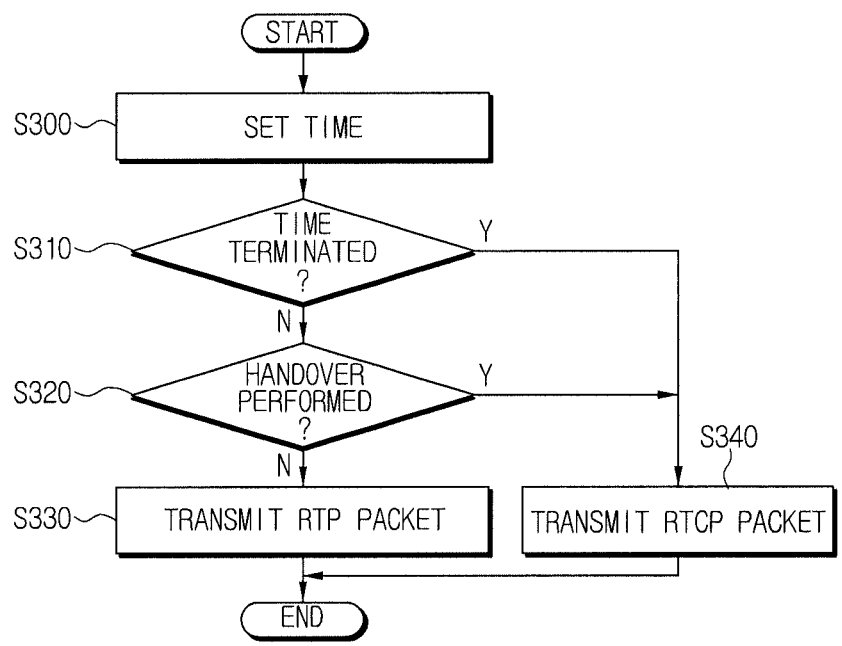
FIG. 4 illustrates a flow chart for a handover control procedure based on real-time transport protocol (RTP)/RTP control protocol (RTCP) processing, according to an embodiment of the present invention.

FIG. 4 illustrates a flow chart for a handover control procedure based on RTP/RTCP processing, in accordance with an embodiment of the present invention.

Referring to FIGS. 1, 2 and 4, the mobile terminal 100 can set a predetermined time, by way of an internal timer (not shown) (operation S300). In this case, the predetermined time means a set point of time for periodically transmitting the RTCP message packet to the data providing server 140. When the predetermined time is set (operation S300) and the set predetermined time has terminated (operation S310), the RTCP message packet is transmitted from the mobile terminal 100 to the data providing server 140 (operation S340). In this case, the RTCP message to be transmitted is a typical RTCP message containing information with respect to the transmitted multimedia data packet loss and so forth.

In addition, when the handover is performed and the difference of the transmission BWs is greater than the predetermined threshold, even before the set predetermined time has terminated (operation S320), the RTCP message packet is transmitted from the mobile terminal 100 to the data providing server 140 (operation S340). However, the RTCP message to be transmitted in this case is not the typical message but the message of requesting the transmission BW change, as described above.

In the meantime, when the predetermined time has not terminated and the handover has not been performed, a typical RTC packet is transmitted (operation S330).

Figure 5:
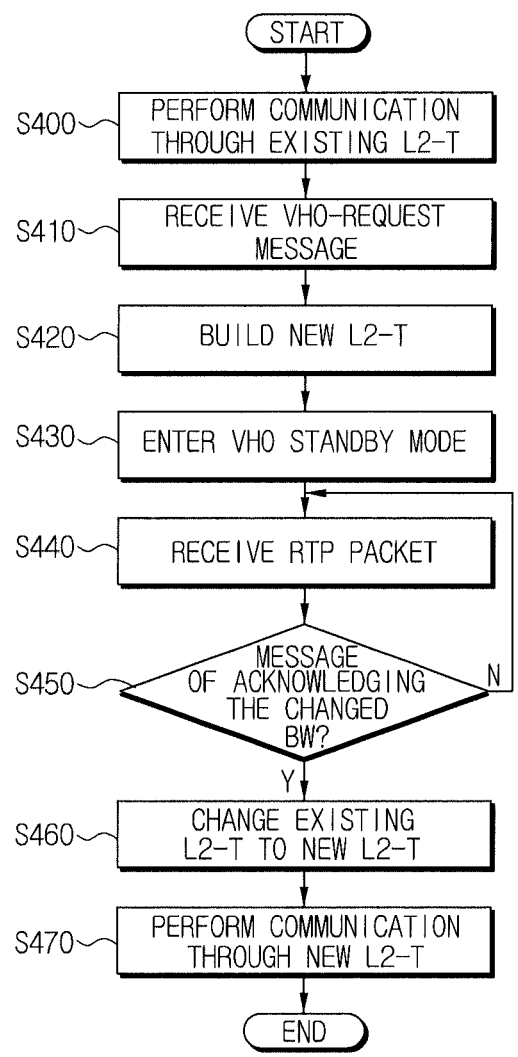
FIG. 5 illustrates a flow chart for a handover control procedure based on a crossover router, according to an embodiment of the present invention.

FIG. 5 illustrates a flow chart explaining a handover control procedure based on a crossover router, in accordance with an embodiment of the present invention.

Referring to FIGS. 1, 2 and 5, the crossover router 130 can be linked to the first AP 110, through the existing second layer tunnel, and transceives various data and messages with the mobile terminal 100 (operation S400). The crossover router 130 builds a new second layer tunnel for the second AP 120 (operation S420) when it receives the VHO-request message (operation S410).

In addition, the crossover router 130 enters the VHO standby mode (operation S430). The crossover router 130 can then check the M field of the RTP packet to determine whether it is set to 1, for example, when it receives the RTP packet from the data providing server 140. In other words, the crossover router 130 determines whether the RTP packet is a message of acknowledging the transmission BW change (operation S450). Upon determination that the RTP packet is the message acknowledging the transmission BW change, the crossover router 130 changes the data transmission tunnel from the existing second layer tunnel to the new second layer tunnel (operation S460), and transceives various data and various messages with the mobile terminal 100 through the new second layer tunnel (operation S470).

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on/in a medium in a variety of ways, with examples of the medium including magnetic storage media (e.g., ROM, floppy disks, hard disks, etc.), optical recording media (e.g., CD-ROMs, or DVDs), for example. The medium may also be a distributed network, so that the computer readable code is stored/transferred and implemented in a distributed fashion.

In accordance with the above method controlling the handover, the transmission BW difference between different kinds of networks may be taken into consideration to perform the handover when the real time multimedia service is provided at a fast speed through a wireless Internet, for example, so that the data packet loss may be effectively removed. In addition, the present invention has an advantage that it may be applied to any differing types of networks having differing transmission BWs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for controlling a network system, wherein a mobile terminal performs a handover from a first network to a second network during data transmission and/or reception through an existing data transmission tunnel between a router and an access point within the first network, comprising:
    transmitting a message, during employment of the existing data transmission tunnel, requesting a transmission bandwidth change of the data transmission and/or reception to a transmission bandwidth supported in the second network, from the mobile terminal to a server after performing the handover;
    changing the transmission bandwidth of the data transmission and/or reception to the transmission bandwidth supported by the second network based on the transmitted message requesting the transmission bandwidth change;
    transmitting a message acknowledging a changing of the transmission bandwidth of the data transmission and/or reception, from the server to the router, after the changing of the transmission bandwidth of the data transmission and/or reception; and
    transceiving data through a new data transmission tunnel between the router and an access point within the second network based on the message acknowledging the changing of the transmission bandwidth of the data transmission and/or reception.

2. The method of claim 1, wherein the mobile terminal performs the handover from the first network to the second network upon movement of the mobile terminal.

3. The method of claim 1, wherein the transmitting of the message requesting the bandwidth change comprises:
    collecting information, by the mobile terminal, regarding the transmission bandwidth supported by the second network when the handover is performed;
    determining, by the mobile terminal, whether a difference between a transmission bandwidth supported by the first network and the transmission bandwidth supported by the second network is greater than a predetermined threshold; and
    transmitting the message requesting the bandwidth change from the mobile terminal to the server upon the determination that the difference is greater than the predetermined threshold.

4. The method of claim 1, further comprising:
transmitting a vertical handover (VHO) request message from the mobile terminal to the router upon the handover being performed; and
building, by the router, the new data transmission tunnel based on the transmitted VHO request message.

5. The method of claim 4, further comprising:
entering a standby mode, by the router, maintaining the data transmission and/or reception through the existing data transmission tunnel based on the transmitted VHO request message, and
wherein the transceiving of the data transmission and/or reception includes having the router change the data transmission and/or reception from the existing data transmission tunnel to the new data transmission tunnel when the message acknowledging the changing of the transmission bandwidth of the data transmission and/or reception is transmitted.

6. The method of claim 1, wherein the message requesting the bandwidth change uses an application (APP) message among RTP control protocol (RTCP) messages.

7. The method of claim 1, wherein the message acknowledging the changing of the transmission bandwidth of the data transmission and/or reception uses a real time transport protocol (RTP) in which an M field is set to 1.

8. At least one non-transitory computer readable medium comprising computer readable code to implement the method of claim 1.

9. A method for controlling a router in a network system, wherein a mobile terminal performs a handover from a first network to a second network during data transmission and/or reception through an existing data transmission tunnel between a router and an access point within the first network, comprising:
receiving a vertical handover (VHO) request message from the mobile terminal;
building a new data transmission tunnel between the router and an access point within the second network based on the received VHO request message; and
transceiving data through the new data transmission tunnel between the router and the access point within the second network when a message acknowledging a changing of the transmission bandwidth of the data transmission and/or reception, based on a message, during employment of the existing data transmission tunnel, from the mobile terminal to the server requesting a transmission bandwidth change of the data transmission and/or reception so as to have a transmission bandwidth supported by the second network, is received from the server.

10. The method of claim 9, wherein the mobile terminal performs the handover from the first network to the second network upon movement of the mobile terminal.

11. The method of claim 9, wherein the transceiving of the data comprises:
receiving from the server the message acknowledging the changing of the transmission bandwidth of the data transmission and/or reception;
changing the data transmission and/or reception from the existing data transmission tunnel to the new data transmission tunnel based on the received message acknowledging the changing of the transmission bandwidth of the data transmission and/or reception; and
transceiving data through the new data transmission tunnel.

12. The method of claim 11, further comprising:
entering a standby mode of maintaining data transmission and/or reception through the new data transmission tunnel based on the received VHO request message, and
wherein the changing of the data transmission tunnel includes changing from the existing data transmission tunnel to the new data transmission tunnel when the message acknowledging the changing of the transmission bandwidth of the data transmission and/or reception is received during the standby mode.

13. The method of claim 9, wherein the message acknowledging the changing of the transmission bandwidth of the data transmission and/or reception uses a real time transport protocol (RTP) in which an M field is set to 1.

14. The method of claim 9, wherein the message requesting the bandwidth change uses an application (APP) message among RTP control protocol (RTCP) messages.

15. At least one non-transitory computer readable medium comprising computer readable code to implement the method of claim 9.

16. A network system, wherein a mobile terminal performs a handover from a first network to a second network during data transmission and/or reception through an existing data transmission tunnel between a router and an access point within the first network, comprising:
the mobile terminal to transmit to a server a message, during employment of the existing data transmission tunnel, requesting a transmission bandwidth change of the data transmission and/or reception to a transmission bandwidth supported in the second network, after performing the handover;
the server to change the transmission bandwidth of the data transmission and/or reception to the transmission bandwidth supported by the second network based on receipt of the message requesting the transmission bandwidth change, and to transmit a message to the router acknowledging a changing of the transmission bandwidth of the data transmission and/or reception, after the changing of the transmission bandwidth of the data transmission and/or reception; and
the router to transceive data through a new data transmission tunnel between the router and an access point within the second network based on the message acknowledging the changing of the transmission bandwidth of the data transmission and/or reception.

17. The system of claim 16, wherein the mobile terminal performs the handover from the first network to the second network upon movement of the mobile terminal.

18. The system of claim 16, wherein, in the transmitting of the message requesting the bandwidth change, the mobile terminal collects information regarding the transmission bandwidth supported by the second network when the handover is performed, determines whether a difference between a transmission bandwidth supported by the first network and the transmission bandwidth supported by the second network is greater than a predetermined threshold, and transmits the message requesting the bandwidth change to the server upon the determination that the difference is greater than the predetermined threshold.

19. The system of claim 16, wherein the mobile terminal transmits a vertical handover (VHO) request message to the router upon the handover being performed and the router builds the new data transmission tunnel based on the transmitted VHO request message.

20. The system of claim 19, wherein the router enters a standby mode to maintain the data transmission and/or reception through the existing data transmission tunnel based on the transmitted VHO request message, and the router changes the data transmission and/or reception from the existing data transmission tunnel to the new data transmission tunnel when the message acknowledging the changing of the transmission bandwidth of the data transmission and/or reception is received.

21. The system of claim 16, wherein the message requesting the bandwidth change uses an application (APP) message among RTP control protocol (RTCP) messages.

22. The system of claim 16, wherein the message acknowledging the changing of the transmission bandwidth of the data transmission and/or reception uses a real time transport protocol (RTP) in which an M field is set to 1.

23. A router, in a network system wherein a mobile terminal performs a handover from a first network to a second network during data transmission and/or reception through an existing data transmission tunnel between the router and an access point within the first network, to at least receive a vertical handover (VHO) request message from the mobile terminal, build a new data transmission tunnel between the router and an access point within the second network based on the received VHO request message, and transceive data through the new data transmission tunnel between the router and the access point within the second network when a message acknowledging a changing of the transmission bandwidth of the data transmission and/or reception, based on a message, during employment of the existing data transmission tunnel, from the mobile terminal to the server requesting a transmission bandwidth change of the data transmission and/or reception so as to have a transmission bandwidth supported by the second network, is received from the server.

24. The router of claim 23, wherein the mobile terminal performs the handover from the first network to the second network upon movement of the mobile terminal.

25. The router of claim 23, wherein, in the transceiving of the data, the router at least receives from the server the message acknowledging the changing of the transmission bandwidth of the data transmission and/or reception, changes the data transmission and/or reception from the existing data transmission tunnel to the new data transmission tunnel based on the received message acknowledging the changing of the transmission bandwidth of the data transmission and/or reception, and transceives data through the new data transmission tunnel.

26. The router of claim 25, wherein the router enters a standby mode of maintaining data transmission and/or reception through the new data transmission tunnel based on the received VHO request message, and changes the data transmission and/or reception from the existing data transmission tunnel to the new data transmission tunnel when the message acknowledging the changing of the transmission bandwidth of the data transmission and/or reception is received during the standby mode.

27. The router of claim 23, wherein the message acknowledging the changing of the transmission bandwidth of the data transmission and/or reception uses a real time transport protocol (RTP) in which an M field is set to 1.

28. The router of claim 23, wherein the message requesting the bandwidth change uses an application (APP) message among RTP control protocol (RTCP) messages.

* * * * *